March 10, 1931.  T. D. BOTTOME  1,795,286
ELECTRICAL SILVER COIN DETECTING METHOD
Filed Sept. 13, 1929
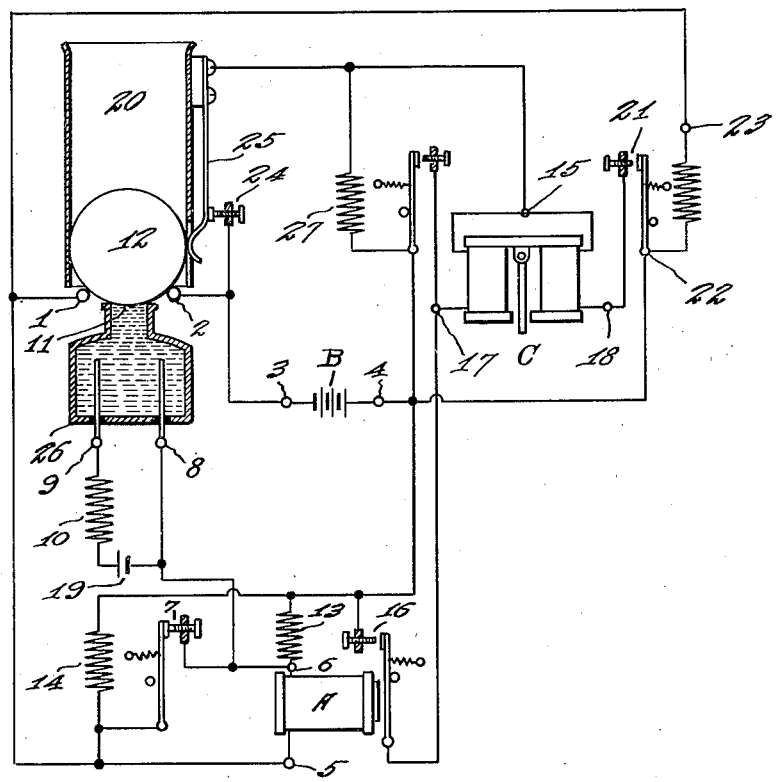
Inventor
TURNER D. BOTTOME,
By  Turner D Bottome
Attorney

Patented Mar. 10, 1931

1,795,286

UNITED STATES PATENT OFFICE

TURNER D. BOTTOME, OF INDIANAPOLIS, INDIANA

ELECTRICAL SILVER-COIN-DETECTING METHOD

Application filed September 13, 1929. Serial No. 392,430.

The present invention is a method for the detection of silver coins and of substitutes for silver coins as used in coin operated vending machines. In its operation advantage is taken of the fact that an electric current is generated by chemical action when two different metals are electrically connected and immersed in a suitable electrolyte to form a voltaic cell.

In practice, an electrolyte may consist of a mixture of hydrochloric acid, glycerine, and a solution of ammonium chloride in water. Such electrolyte contains chlorine which is capable of combining with silver to form an insoluble chloride that has the property of rapidly polarizing or electrically insulating a silver electrode in a voltaic cell when short-circuited to an electrode more electronegative than silver. Other acids than hydrochloric or bases combined with chlorine, are capable of combining with silver to form an insoluble silver salt when used in an electrolyte hence electrolytes adapted to form other insoluble or insulating silver salts may be used with more or less success.

The drawing accompanying this specification comprises a single figure which shows one embodiment of the invention.

The electrolyte is conveniently contained in a receptacle 26 which together with electrode 8 and a liquid connection 11 to the edge of a coin or disk 12 comprises a voltaic cell. An electrode 9 is also included in the cell by means of which an electrolytic cell is formed when electrodes 8 and 9 are connected to a source of electric current 19 through the fixed resistance 10. Receptacle 26 is in reality an electrolytic cell within a voltaic cell.

The electrolyte within cell 26 is understood to be maintained to a constant level by suitable means, the proper level being one that a liquid contact 11 will be made by the check or disk 12 when it is resting upon contacts 1 and 2. The three contacts just named may be so adjusted that a coin or disk smaller than the size coin intended for the apparatus will not make all three electrical connections, hence such disk will act as a non-metallic one and will be ejected or kicked-out of the apparatus as explained further on.

The electrode 8 of the cell 26 is preferably made of gold, but almost any other metal more electronegative than silver may do equally as well, for instance, platinum, or others, but gold is less expensive than most others and is sufficiently effective. The electrode 8 is placed in connection 6 with one terminal of an electro-magnetic relay A, while the other terminal 5 is connected to the coin support 1 and serves to place the coin 12 in connection with the electrolyte 11, thus completing the voltaic cell circuit. At the same time there is a thermo relay 14 connected across the terminals 5 and 6 of the relay A which serves to normally short circuit the voltaic cell 26, but the coin 12 when resting upon contacts 1 and 2, completes electrical connections placing the heating element of the relay 14 in circuit with the terminals 3 and 4 of a storage battery B or other suitable source of electric current, an interval of time is required for the heating element in relay 14 to open the short-circuit contact 7, about one second from the time the coin is dropped into the chute 20 is usually sufficient to open the short-circuit, when this has been done and a silver coin has been used, the chemical action that has taken place within the voltaic cell during the time the short-circuit was on, has effected the silver either by polarization, insulation or in some manner to have reduced the electromotive force and the amperage of the cell to almost zero, the available current being insufficient to energize the relay A, but when the coin 12 was dropped into the chute 20 a thermo relay 21 was placed in electrical circuit by means of the coin contacts 1 and 2, the battery B contacts 3 and 4 and through the relay heating element terminals 22 and 23, this relay is adjusted to work a trifle later than relay 14, hence if relay A does not become energized immediately when the short-circuit 7 is opened, relay 21 will act making a contact placing terminal 4 of the battery B in circuit with 22 which connects to 18 of a double acting magnet C through same from terminal 15 to the spring 25 and contact 24 to terminal 3 of the battery B, thus completing the circuit and energizing the magnet C which is adapted through terminals 15, 18, to retain or kick-in the coin within the associated coin operated vending machine.

The magnet C is also provided with a connection 17 which, with a common terminal 15, when placed in circuit with the battery B is adapted to eject or kick-out a disk from the contacts 1 and 2 and from the apparatus when such disk is other than that of a silver coin.

Hence, if the disk 12 is made of a metal more electro-positive than silver, such as brass, lead, iron, nickel alloys or almost any of the common metals, an electromotive force will be generated between such metal and the electrode 8, and such current will be of sufficient amperage to energize the relay A, thus closing the contact 16 which leads from battery B terminal 4 to connection 17 of the magnet C thence from 15 to the spring 25 through contact 24 to battery B terminal 3, completing the circuit and energizing the magnet C to kick-out the spurious coin.

The spring 25 is adapted to make a battery contact when any disk is dropped into the coin chute 20 to rest upon contacts 1, 2, and make connection at the point 11; but if a non-conducting disk is used, no electrical contact will be made at these points, but the spring 25 will be forced into contact with the point 24 which will complete a circuit beginning at battery B terminal 3 through 24, 25, the heating element of the thermo relay 27 thence to battery terminal 4. This thermo relay is adjusted to work a little slower than either relay 14 or 21, but when it does operate it completes a circuit from battery terminal 3 through 24, 25, to 15 of the magnet, then through 17 and the contact of relay 27 to battery terminal 4 completing the circuit and energizing the magnet to kick-out the disk. If a metal disk is used that does not complete all three contacts 1, 2, and 11, it will act as a non-metal and will be kicked-out in the manner above described.

Gold or other electro-negative metal when forming the positive terminal of a voltaic cell using a single non-depolarizing electrolyte, has the property of becoming polarized very rapidly when the electrodes are of small size and the cell is placed on short-circuit, and the amperage of the cell will fall almost to zero very quickly. To overcome this difficulty a separate battery may be used, preferably a closed circuit type as at 19 the positive terminal being connected with electrode 8 and the negative terminal with a suitable fixed resistance 10, thence to a cathode 9 which may be of gold or other suitable metal, these connections make the electrode 8 an anode in an electrolytic cell, and the steady current from the battery 19 serves to keep the electrode 8 constantly depolarized while it is operating at the same time as the negative electrode of the voltaic cell 26. Hence cell 26 will deliver a steady current of large amperage compared to the surface area of its electrodes, and it is noteworthy that the cell shows a considerable increase in amperage when it is short-circuited when metals more electro-positive than silver are used for the disk 12. When silver is used for the disk 12 a comparatively large current may be obtained for an instant if no short circuit is used, but with the short circuit the amperage falls almost to zero almost at once as heretofore explained.

A sensitive polarized relay may be used for relay A, but in practice good results are obtained with an ordinary electro-magnetic relay such as used in common telegraph work, it may be adjusted so that the small amperage generated in cell 26 after being short-circuited when silver is used for the disk 12 that such current will not energize the relay A, but when any of the metals more electro-positive than silver are used, the amperage will be much greater after the preliminary short-circuit than in the case of silver, and such current will easily energize the relay A, but by placing a suitable fixed resistance 13 in connection with the negative terminal 4 of the battery B and to terminal 6 of the relay, thence from terminal 5 to coin contact 1 and through disk 12 to contact 2 and on to the positive terminal 3 of the battery B, a circuit will be completed through the relay in the reverse direction to that of the current flowing through the relay from the voltaic cell 26, thus making a differential current though the relay that may be practically equalized when a silver coin is used as the disk 12 by adjusting the resistance 13 to reduce the battery B current to a value about equal to that of the cell 26.

The reverse current through relay A adds sensitiveness to the relay by instantly wiping out the residual magnetism that is ordinarily left in the magnets after a current has been passed through the relay, such as that from cell 26. This reverse current need not exceed more than that to equalize the current from a silver coin as above mentioned.

It is to be noted that the heating elements of the relays 14, 21, and 27 may all be connected together in series to the battery B through contact 24 when a disk 12 is in place in the chute 20. This method of connecting said relays is not shown on the accompanying drawing as its use does not change the method of operation of an apparatus embodying this invention, it is mentioned as a useful modification. It is also to be noted that thermo relays are not essential as any other type of relay having retardation upon closing of the circuit will answer, the electro-magnetic type with a slow moving armature being preferable.

I claim:

1. The silver coin and coin substitute detector which consists of a voltaic cell, means including a coin chute for placing a check in contacting position to act as the positive electrode of said cell, a separate source of electric current, a negative electrode and a third electrode in said cell connected to the positive and negative terminals respectively of the separate source of current, which source of current together with its connected electrodes and the electrolyte of the voltaic cell comprises an electrolytic cell within said voltaic cell, a relay in circuit with said voltaic cell, a slow acting short-circuiting device having an armature provided with contacts which are connected with and normally short circuit said relay, a battery in circuit with said short-circuiting device, a time controlled relay having a longer time interval than said short-circuit device in circuit with said battery, said battery circuits being completed by the contacting means of said check when in position as the positive electrode, a double acting electromagnet having an armature for selectively ejecting a coin or a coin substitute from the detector, which magnet is placed in circuit with said battery to eject a coin substitute in one direction and a silver coin in the opposite direction, said selective ejecting being effected through the contacting action of the voltaic cell relay or the time controlled relay respectively depending upon whether a coin substitute or a silver coin is inserted in said coin chute.

2. In the structure defined in claim 1, the addition of a fixed resistance, one terminal of which connects to the negative terminal of the battery, the other terminal of said resistance connecting with the negative electrode of the voltaic cell to complete a circuit through the voltaic cell relay, which circuit leads through said relay in opposed relation to the current from said voltaic cell to make contact with the electrolyte in said cell, and thence with a check placed in connection with the positive terminal of said battery, whereby said resistance is adapted to provide means for conducting a differential current through said relay to practically equalize the current through said relay from the voltaic cell when a silver coin is used as the positive electrode in said cell.

3. The silver coin and coin substitute detector which consists of a voltaic cell, a relay in circuit with said cell, means for placing a check in electrical contact to form the positive electrode of said cell, means for depolarizing the negative electrode of said cell, means for short-circuiting said relay for a limited time then for opening the short-circuit, a battery, a time controlled device having a longer time interval than that of the short-circuiting means, an electromagnet, contacting means for completing the circuit with said check through the battery and the time controlled device, whereby the strength of current generated in the voltaic cell energizes the relay when the check is a coin substitute, but does not energize the relay when the check is a silver coin, said time controlled device being the means for becoming energized when the check is a silver coin, the energizing of the relay or of the time controlled device being a selective means for directing the current from the battery through said electromagnet which is adapted to become energized to eject the check in one or the other direction, depending upon whether the check is a silver coin or a coin substitute.

4. In the structure defined in claim 1, the addition of a slow acting relay having a longer time interval than that of the time controlled relay, contacting means being included for placing the slow acting relay in circuit with said battery when a check or coin of suitable size is inserted in the coin chute, the contacts of said slow acting relay being the means for completing the battery circuit through the electromagnet to selectively eject said check from the detector and to direct it in the check rejecting direction.

TURNER D. BOTTOME.